(12) United States Patent
Weston et al.

(10) Patent No.: US 11,433,719 B1
(45) Date of Patent: Sep. 6, 2022

(54) ADAPTIVE TIRE PRESSURE ALERTS AND REMEDIATION

(71) Applicant: FORD GLOBAL TECHNOLOGIES, LLC, Dearborn, MI (US)

(72) Inventors: Keith Weston, Canton, MI (US); Trystan Magnuson, Dearborn, MI (US); Brendan F. Diamond, Grosse Pointe, MI (US); Ryan O'Rourke, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/246,863

(22) Filed: May 3, 2021

(51) Int. Cl.
B60C 23/04 (2006.01)

(52) U.S. Cl.
CPC ...... B60C 23/0474 (2013.01); B60C 23/0433 (2013.01); B60C 23/0488 (2013.01); *B60C 23/0416* (2013.01)

(58) Field of Classification Search
CPC ............ B60C 23/0474; B60C 23/0433; B60C 23/0488; B60C 23/0416
USPC .................................................. 340/442–445
See application file for complete search history.

(56) References Cited

U.S. PATENT DOCUMENTS

| | | | |
|---|---|---|---|
| 6,810,727 B1* | 11/2004 | Davis | B60C 23/0408 73/146.2 |
| 7,197,422 B2* | 3/2007 | Gaunt | B60C 23/04 73/146.2 |
| 10,486,476 B2* | 11/2019 | Patel | B60C 23/0405 |
| 10,583,844 B2 | 3/2020 | Robson et al. | |
| 10,657,739 B2* | 5/2020 | Mader | B60C 23/0479 |
| 2005/0264405 A1* | 12/2005 | Ueda | B60C 23/0401 340/442 |
| 2006/0071766 A1* | 4/2006 | O'Brien | B60R 1/12 340/442 |
| 2006/0220813 A1* | 10/2006 | Utter | B60C 23/0408 73/146 |
| 2006/0235652 A1* | 10/2006 | Rimkus | B60C 23/0476 702/183 |
| 2016/0121666 A1* | 5/2016 | Chan | B60C 23/20 137/78.1 |
| 2016/0347130 A1* | 12/2016 | Chan | B60C 23/002 |
| 2019/0118589 A1* | 4/2019 | Patel | B60C 23/0471 |
| 2021/0229506 A1* | 7/2021 | France | B60C 23/002 |

\* cited by examiner

*Primary Examiner* — Eric Blount
(74) *Attorney, Agent, or Firm* — Michael Spenner; Brooks Kushman

(57) ABSTRACT

A vehicle determines that it is within a predefined proximity of a location for which an alternative tire pressure different from a current vehicle tire pressure has been defined. The vehicle changes a tire pressure monitoring system setting to utilize the alternative tire pressure as an alert threshold, responsive to determining that the vehicle is within the predefined proximity. Also, the vehicle determines that the vehicle has traveled more than a predefined distance from the location and, responsive to the vehicle having traveled more than a predefined distance, reverts the tire pressure monitoring system to use base settings for alert thresholds.

18 Claims, 4 Drawing Sheets

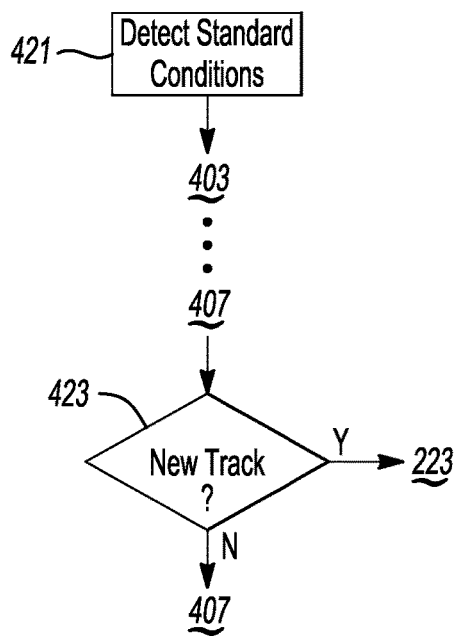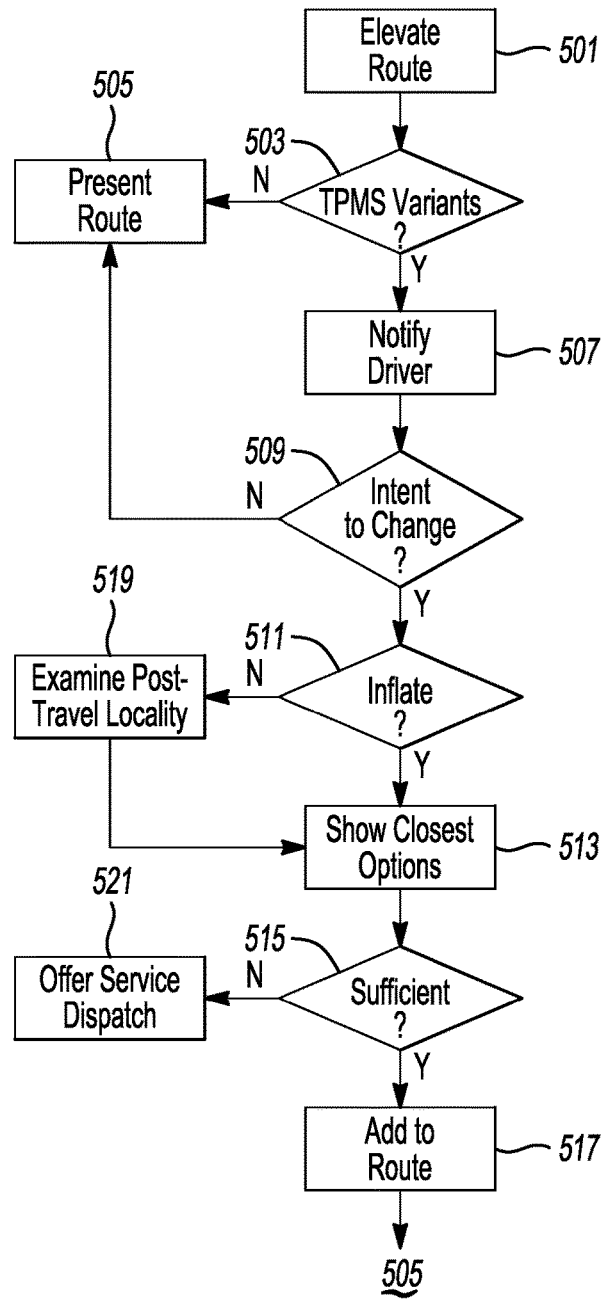

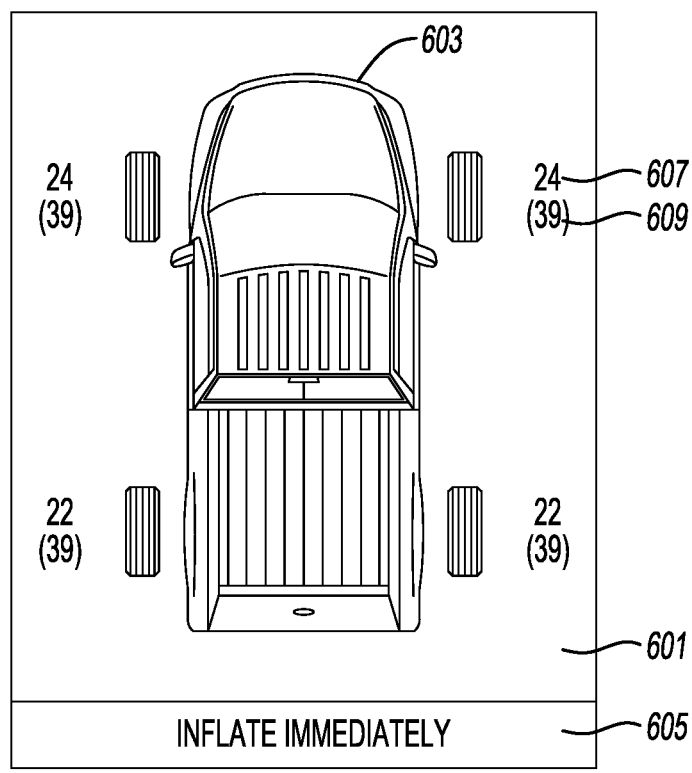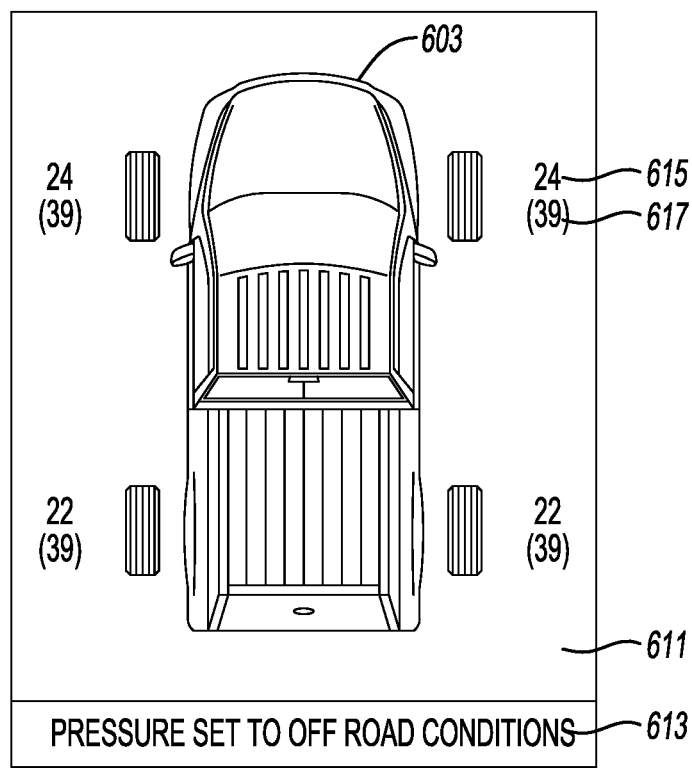
Fig-6

ADAPTIVE TIRE PRESSURE ALERTS AND REMEDIATION

TECHNICAL FIELD

The systems, methods and apparatuses generally relate to adaptive tire pressure alerts and remediation.

BACKGROUND

Automotive original equipment manufacturers (OEMs) are producing an ever increasing number of performance vehicles, in response to customer demand for situationally suited vehicles. These include, for example, off road vehicles (ORVs) with enhanced control for rough, unpaved environments, and high speed vehicles built with an eye towards being run on race tracks.

While many systems can adapt electronically, there is no automatic switch between tires suited for each environment. And while professional drivers may have a crew that can outfit their vehicle correctly for a given drive, casual sports drivers tend to drive their vehicles to a course and then use the same vehicle (with the same tires on which they drove in) to run the course.

Tire pressure monitoring systems report tire pressure for vehicle tires and alert a driver if the tire pressure is too low or too high. When significantly outside of a preferred range, these alerts can persist because expensive damage to a vehicle can result when the vehicle is driven on tires that are inflated to a level well above or below a preferred range.

SUMMARY

In a first illustrative embodiment, a system includes a processor enabled to determine that a vehicle is within a predefined proximity of a location for which an alternative tire pressure different from a current vehicle tire pressure has been defined. The processor is further enabled to change a tire pressure monitoring system setting to utilize the alternative tire pressure as an alert threshold, responsive to determining that the vehicle is within the predefined proximity. Also, the processor is enabled to determine that a vehicle has traveled more than a predefined distance from the location and, responsive to the vehicle having traveled more than a predefined distance, revert the tire pressure monitoring system to use base settings for alert thresholds.

In a second illustrative embodiment, a method includes determining that a vehicle is within a predefined proximity of a location for which an alternative tire pressure different from a current vehicle tire pressure has been defined. The method further includes changing a tire pressure monitoring system setting to utilize the alternative tire pressure as an alert threshold, responsive to determining that the vehicle is within the predefined proximity. Also, the method includes determining that a vehicle has traveled more than a predefined distance from the location and, responsive to the vehicle having traveled more than a predefined distance, reverting the tire pressure monitoring system to use base settings for alert thresholds.

In a third illustrative embodiment, a non-transitory computer readable storage medium, stores instructions that, when executed, cause a processor to perform a method including determining that a vehicle is within a predefined proximity of a location for which an alternative tire pressure different from a current vehicle tire pressure has been defined. The method also includes changing a tire pressure monitoring system setting to utilize the alternative tire pressure as an alert threshold, responsive to determining that the vehicle is within the predefined proximity. Further, the method includes determining that a vehicle has traveled more than a predefined distance from the location, and, responsive to the vehicle having traveled more than a predefined distance, reverting the tire pressure monitoring system to use base settings for alert thresholds.

BRIEF DESCRIPTION OF THE DRAWINGS

FIGS. 4A and 4B show illustrative examples of reversion processes;

FIG. 5 shows an illustrative example of TPMS-based planning; and

FIG. 6 shows illustrative views of TPMS before and after adaptation to an environment.

DETAILED DESCRIPTION

Figure 1:
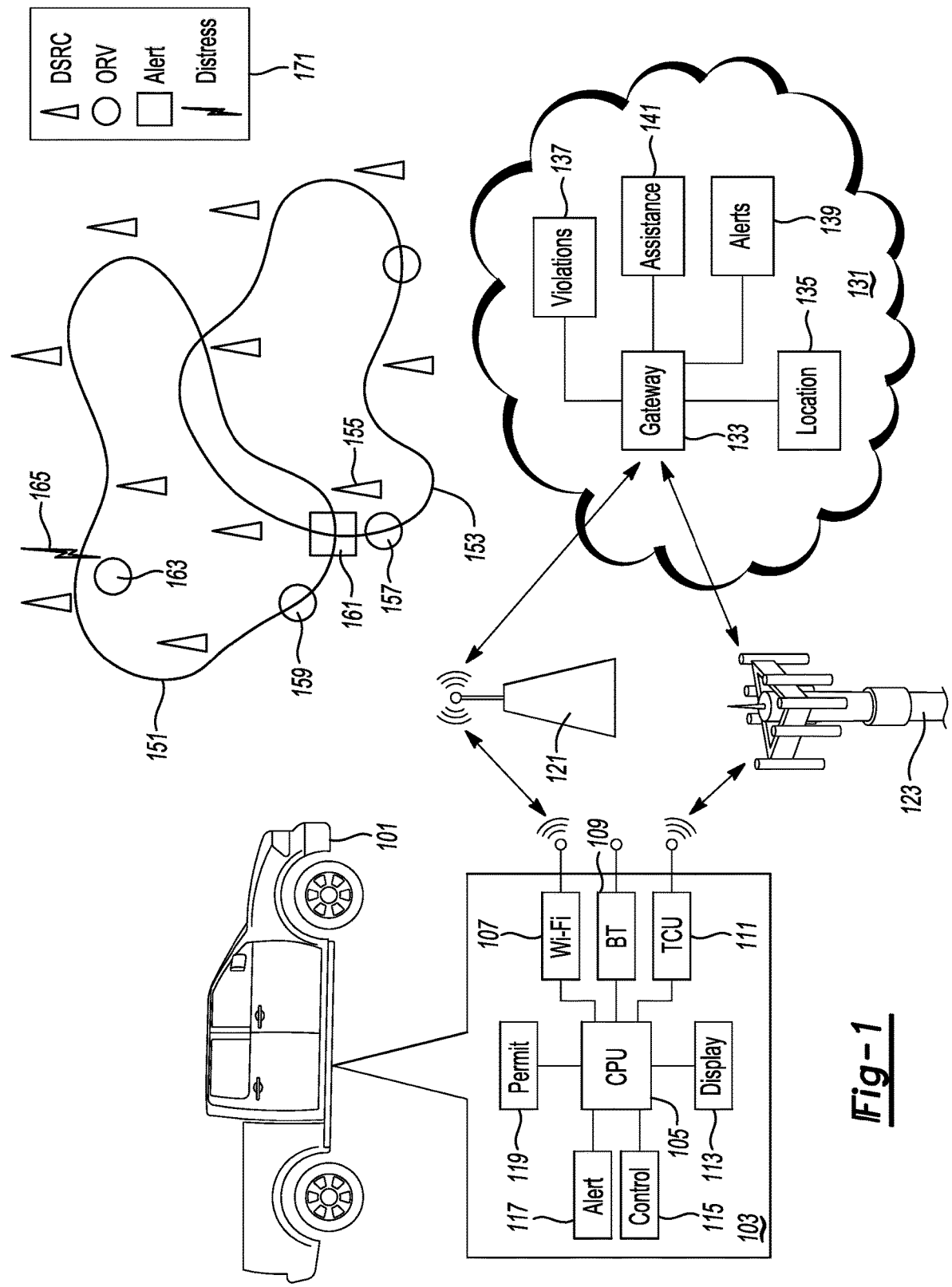
FIG. 1 shows an illustrative example of a vehicle communication system.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

Execution of processes may be facilitated through use of one or more processors working alone or in conjunction with each other and executing instructions stored on various non-transitory storage media, such as, but not limited to, flash memory, programmable memory, hard disk drives, etc. Communication between systems and processes may include use of, for example, Bluetooth, Wi-Fi, cellular communication and other suitable wireless and wired communication.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

While not an actual impediment to driving, persistent and nagging in-vehicle alerts can be distracting to drivers who are attempting a performance course. Whether driving at high speeds or over rough terrain, drivers in such environments do not want to be distracted by vehicle alerts. Further, if a driver has over-inflated (for race courses) or under-inflated (for off road courses) tires that trigger an alert about tire pressure, the driver may be doubly annoyed because the tire pressure was exactly where the driver intended it to be, and suitable for the type of driving and course. But, the vehicle does not know this, and instead defaults to standard road-driving tire pressure and so generates an alert that is situationally unnecessary.

At the same time, the driver does not want to simply turn off the alerts, if that capability even exists, because the alerts serve a valuable reminder when the driver leaves the track/course to change the tire pressure back to normal. If the driver forgot to re-engage the alerts, then the driver could be driving on surface roads with a tire state that may result in vehicle damage.

Further, for more casual drivers, it may not be clear how tire pressure state should change when driving on a track/course. Some drivers may know to change their tire pressure, but not by how much, and so they may be forced to guess. Other drivers may not even realize that their tire pressure is not optimized for the current course, and may proceed with a pressure that is not best suited for the course.

The illustrative embodiments improve the functioning of the tire pressure management system (TPMS) by adapting the recommended levels to current conditions. For example, by geo-fencing a course, or by detecting driving and vehicle sensor data matching a profile of a person not on "normal" roads, the vehicle may recognize that performance driving is engaged, and change the recommended tire pressure to match the type of driving estimated or observed. This allows all users to avoid unnecessary alerts, and in fact will actually generate correct alerts when the tires are inflated to "standard" pressure (prior non-alert state) which may be not best suited for the current conditions. While a variant of the concept that simply disables alerts in race track or off road conditions is certainly possible and within the scope of present contemplation (the same system automatically reactivating alerts when the driver leaves the course/track), another option is to calibrate the alerts to match the type of driving, and thus provide additional information to drivers who do not know how to accurately tune their tire pressure to the current conditions.

Even for non-high-performance vehicles (e.g., a stock truck instead of a performance truck) this sort of information can be useful, as trucks, especially, are frequently used in off-road conditions. And for any vehicle that is engaged in a race, whether on a track or otherwise, the driver may want to know that their tires are at a correct level to maximize their performance. The numbers may vary vehicle-to-vehicle, and terrain-to-terrain, and a system that further can adapt to optimize these numbers can add an additional aspect of utility in that it begins to function more like a skilled pit crew member. Decisions about how to adjust a baseline recommendation can be based on observation of vehicles on the same course or on similar courses under similar conditions. Calibration can be done generally (a delta to be applied to all recommendations, either a flat value or a percentage off baseline, for example) or it can be done for specific classes, makes, models, etc., if sufficient data exists to tune the number to a certain vehicle having certain features.

Recommendations may also change during a user experience on a single instance. For example, a vehicle with cold tires that is running on a race-track may have a recommended tire pressure of 28 PSI. Once the tires have been heated up through driving, the tire pressure recommendation may be 38 PSI. Because the vehicle can determine how much driving has been done on the track, and can even determine current environmental conditions (e.g., temperature, sunlight, etc.), the vehicle can make a reasonable guess as to when the tires are heated and can recommend a change to tire pressure accordingly.

In other instances, such as off-road courses, the tire pressure recommendations may be 15 PSI or below, and may vary from vehicle to vehicle and between front and rear tires. Accordingly, it is more useful to a user if a vehicle can tell the user the correct or estimated correct situational tire pressure recommendation than for the user to potentially have to know the correct pressure for a near infinite number of vehicle+track combinations. And even then, a course may include dirt, sand and mud tracks, which all may have varied recommendations. Or a track may be some of each type, and a user may not know which condition to use as the controlling condition for tire pressure tuning. Aspects of the illustrative embodiments, and the like, can solve such issues and also avoid false-positives on warning users about current tire pressure states.

FIG. 1 shows an illustrative example of an ORV and vehicle communication system, as well as a virtual map of an ORV recreational area. In this example, one or more vehicles 101 include onboard communication and computing systems 103. These can include, but are not limited to, one or more processors 105 and a plurality of onboard communication controllers and transceivers. Exemplary communication systems include, but are not limited to, Wi-Fi transceivers 107, which can communicate with DSRC transceivers 121 if properly enabled, BLUETOOTH transceivers 109, which can communicate with in-vehicle devices and other vehicles and infrastructure elements, telematics control units (TCUs) 111, which can communicate with cellular networks 123, and other such devices usable for V2X communication.

The vehicle systems 103 may also include a plurality of hardware, software or firmware devices that provide for various aspects of in-vehicle information provision and systems control. This can include, for example, without limitation, a display 113, vehicle control logic 115 (achievable through use of software, firmware and electronic control units (ECUs), for example), and alert handling process 117. In illustration only, these are examples of some of the onboard devices and logical systems that allow for implementation of aspects of the illustrative embodiments and the like.

Additionally, at an on-site server or elsewhere in the cloud 131 (or both, in many instances), there may be one or more gateway processes 133, location tracking and provision processes 135, alert handling processes 139, violation defining and handling processes 137, and driver-assistance processes 141. Various aspects of processes described herein, and the like, may occur onboard, on-site or in the cloud as is appropriate and based on equipment provided to the vehicles and on-site systems. For example, a highly advanced ORV may be able to handle a great deal of onboard process control, whereas an older ORV may have an aftermarket unit with a display installed that provides basic location tracking and alert-provision capability.

Display 150 is an example of a display that may be shown in both a vehicle and a central monitoring system, or either alone. Data included in this display may be provided to drivers in audible or haptic forms, whether or not the display is also available in the vehicle 101. The key 171 shows a variety of exemplary pieces of data that may be shown on the displayed track maps 150, such as DSRC locations, ORV present or known locations, alert situations and distress signals, as well as any other appropriate information.

In this example, the display, which may be viewed by a vehicle 101 operator using display 113, for example, or may be viewed by on-site or off-site personnel or authorities, includes two tracks defined as 151 and 153. These tracks may have defined boundaries or may have been defined using a mapping creation process such as that shown in illustrative FIG. 6, whereby a series of GPS coordinates loosely defines the general route for a track. The tracks may be marked physically or virtually (using digital infrastructure and coordinates) and may further include a number of DSRC transceivers 155, the locations of which are shown on the display. The display of DSRC locations may be useful as guidelines to a track and/or provide location points to which a distressed vehicle 101 may attempt to reach or become proximate too, in order to ensure signal transmission. While it would be useful to have overlapping DSRC coverage covering the entire locations of both tracks 151, 153, due to outages, signal loss, and unavailability of mounts, for example, it may not always be possible to achieve this. Active vs. inactive DSRC may also be indicated by the display, using colors or other suitable designators.

The track display 150 also shows the known, last known or projected (e.g., dead-reckoned) location of each vehicle 157, 159. The tracks themselves may have a directionality aspect, and/or indicators, such as arrows, may provide for vehicle headings. In this example, both vehicles 157, 159 are approaching an intersection of their respective tracks, and thus an alert 161 is shown to indicate a need for caution by both drivers. If either vehicle 157, 159 passed the intersection, the alert could be removed if there was no projected threat of incident (e.g., if the vehicle did not suddenly do an about-face or the other vehicle was not attempting to turn onto the other track where the first vehicle has just crossed).

This display also includes a stranded vehicle 163, which is off-track and which is further sending out a distress signal, indicated by 165. The off-track location and/or signal can be an indicator to other drivers to drive with caution, as well as allow other drivers to potentially assist. Park and/or safety personnel may also respond to the signal with assistance.

In some embodiments, if desired, more information can be obtained about any object on the map through interaction (or already be displayed). For example, selection of vehicle 157 can bring up a display about the type of vehicle, capabilities, known or projected experience of driver, experience with the current track or park, etc. Selection of vehicle 163 could bring up the nature of the distress call (e.g., vehicle stuck vs. person injured), so drivers can determine if they can assist or should leave assistance up to a professional. Selection of the intersection may bring up a recommended speed or control strategy, which may also be shown in conjunction with the alert when generated and/or displayed, so that an active driver can quickly obtain the relevant information. Selection of a DSRC transceiver 155 may show the location of the transceiver in coordinates.

Selection of another vehicle may also allow for communication directly with the vehicle 163, via V2V or V2I communication, for example. Actual communication credentials could be stored in the cloud 131 and rendered accessible through driver permissions, in response to distress, as a requirement for using the park, etc. This can serve to maintain protection of the credentials while also allowing for V2V communication so that drivers can coordinate and assist each other. An encrypted version of a driver cellular phone number could also be provided to the TCU 111, so the vehicle 153 could call the other vehicle 163 directly over the cellular network, if desired, without revealing the actual phone number to the driver. In instances where the distress relates to an injury, for example, an unencrypted version of the number may be broadcast to all vehicles 157, 159 to maximize opportunities to call the driver and assist (e.g., if both vehicles 157, 159 lacked TCUs, those drivers could still use personal cellular phones to contact the number and offer assistance or offer to help obtain assistance. Permission to send such information may be at driver discretion, but local safety regulations may also require that certain information be shared in order to use a track, or in an instance of true emergency. In those cases, entry to the track could apply the relevant local settings automatically, with a notification to the driver about what was being shared and/or an option to leave the track if the driver does not want to share the information.

The above is presented as part of co-pending, commonly owned patent application U.S. patent application Ser. No. 17/240,127 filed Apr. 26, 2021 titled VEHICLE-TO-X COMMUNICATION AND HANDLING FOR VEHICLE COORDINATION AND MANAGEMENT, the contents of which are hereby incorporated by reference. While described in terms of communication systems and interactions for on-track vehicles, the examples can also be extended to tire pressure management. For example, DSRC transceivers can gather localized performance data from vehicles about what measurements occurred in system sensors under what tire pressure states. This can help tune the recommendations to a track. For example, a track that is partially mud and partially gravel may have two possible recommendation sets, one associated with mud and one with gravel. Some users may use one, some may use the other. Tracking vehicle performance can help determine which is the "better" state for overall usage (since the driver is not likely to stop as they approach the other section and retune their tires) and whether a hybrid state between the two pressures is better or worse. The utility of a given pressure state may vary from vehicle to vehicle as well, and so gathering this information can eventually result in recommendations and TPMS settings that are highly tuned for a specific vehicle type on a specific track.

V2V communication can allow for sharing of pressure states. Even before a central server can analyze a complete data set to adjust a recommendation, a driver may pull up to a track and receive, for example, the following information: "There are 4 similar vehicles on the track, all running at 22 PSI. The recommended pressure is 21 PSI. The experience level of the drivers is high, high, medium, low." Then the user could elect to match TPMS settings to the recommendation or to the settings of the experience drivers or an experienced driver, for example. Alternatively, the system could immediately tune the TPMS to 22 instead of 21 based on the preceding information, even if 22 had not been verified by sufficient data, because the instantaneous data indicates that 22 is the current preference of skilled drivers in similar vehicles. The information conveyed can be much more detailed than the preceding as well. This is just an example of the concept presented at a high level.

TPMS recommendations may be stored at an onsite server, in the cloud or even in vehicle 101 memory. Alternative settings made by a driver (e.g., recommendation is 22, driver prefers 24) may be saved with respect to all courses or a given course, and may also be contemplated as a preferred deviance (e.g. ~10% above recommended or 2 PSI above recommended) as appropriate. TPMS warnings could also adjust to maximum track speeds or other variable conditions, since a max speed could be lower on a crowded track. Tire pressure recommendations may also be transmitted by a transmitter on-site at a location, the transmitter identifying the location as an alternative TPMS location, wherein a recommended tire pressure (or a plurality of recommended tire pressures, correlated to vehicles or vehicle types) can be included with the signal and also used as a basis to reconfigure the TPMS.

Figure 2A:
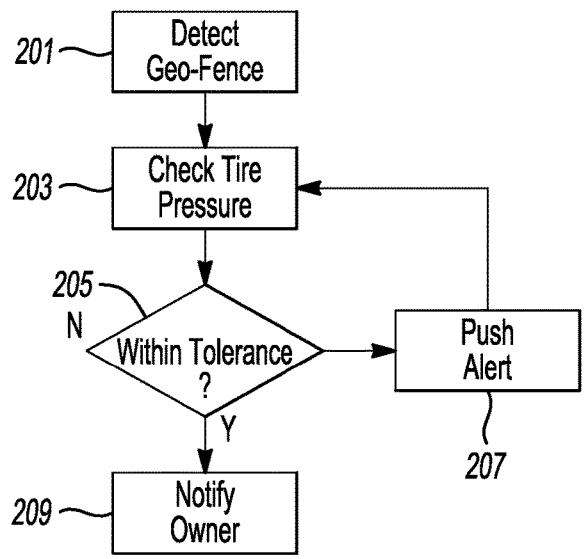
FIGS. 2A and 2B show illustrative examples of processes for automatic TPMS adjustment.
Figure 2B:
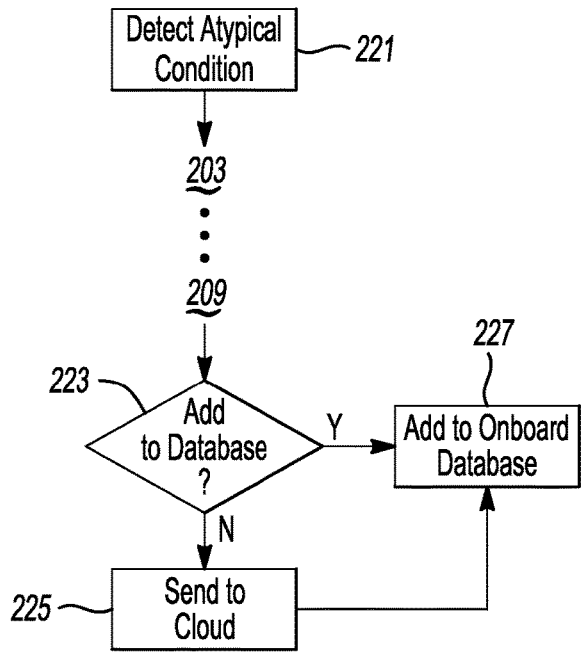

FIGS. 2A and 2B show illustrative examples of processes for automatic TPMS adjustment. In these examples, the processes can react to the presence of a geo-fence or GPS trigger, such as in FIG. 2A, or based on condition monitoring, such as in FIG. 2B, which can be determined through observed vehicle behavior, usage and sensor values.

In FIG. 2A, the process determines that the vehicle 101 has reached a geo-fence associated with a change in TPMS recommendations at 201. This can be a preset fence around a track, an automatically generated fence based on the existence of a track (known from map data), or a driver-designated fence or coordinate set indicating that off-street driving is intended.

Once the vehicle has passed within the bounded region or past the coordinate set, the process recalibrates the TPMS to the recommended setting for the environment and checks the tire pressure at 203 against the new values. These values, as noted, can also change while the driver is within the environment, and so other factors, such as warming up tires, can determine further changes to the TPMS system. Or the TPMS system can have two values displayed, for cool and hot tires, for example, or for an off-road course that can change from dirt to mud if there is weather present (e.g., a dry value and wet value, or a dirt value and mud value). In some instances, the driver may have to make the final evaluation about conditions or tire temperature, and so it may be useful to display alternative conditional recommendations. The TPMS may also wait or delay alerts until the tires have been set to a new value, corresponding to the recommended settings, before issuing alerts or before instantiating the new monitoring value. In other embodiments, the alert process may begin as soon as the vehicle crosses onto the track or past a certain location, so that the driver does not forget to change the tire pressure settings.

The process may also be able to crowdsource tire running temperatures for on-course vehicles, if those vehicles are communicating with an object vehicle and/or local infrastructure. For example, vehicles running on a track can report inflation levels and temperatures, and then the object vehicle (requiring adjustment) can determine what the likely temperature of the tires will be, based on the active vehicles, when determining the recommended adjustment. This can also be displayed as alternative information, alongside historic information for that vehicle (if available) and general recommendations based on a track-type and present weather conditions, etc.

If the tire pressure is within a tolerance of the recommended value at 205, or if the driver prefers, for example, if the tire pressure is exactly the recommended value, the process may notify the driver at 209 that the tire pressure is correct. If the value is off by more than the threshold, the process may push an alert to the vehicle and/or a driver device (e.g., phone) to alert the driver to change the tire pressure at 207.

If the vehicle has an active connection with the driver device, the driver can begin to inflate or deflate the tires and request a refresh of the values and alerts, or the process can be an active monitoring and reporting process. If there is a compressor on-site, over or underinflation is not an issue that cannot be corrected, but if the driver is letting air out, for example, and intends to re-inflate the tires later, then the driver may want to use such a feedback process to ensure that the driver does not let out too much air and then has to leave to re-inflate the tires prior to driving the course. Accordingly, it is possible to push alerts at various stages of pressure change, such as alerting a driver when the tires are closing in on a desired value, or, as noted above, by providing an active monitoring and reporting process that pushes alerts and current states to a driver mobile device as the driver goes from tire to tire.

The example process shown in FIG. 2B has similar responses to triggers, but the initial condition for TPMS change is based on determining that a vehicle is being used in a manner typical of off-street driving and/or racing (whether on-street or not) at 221. Here, feedback from sensors, suspension feedback, speed feedback, GPS location off known roads, etc. can be used as indicators that the vehicle 101 is on a course or track, or is engaged in atypical behavior. While a predefined track may not exist in this instance, the vehicle 101 can still provide a recommended TPMS level or range based on what the behavior appears to indicate the driver is doing.

This process also includes an opportunity to add the current location (off-road, track, or street-course) as a location where altered TPMS values may apply at 223. The database can be private (onboard) and/or shared. If the driver wants to add the current course to a personal database at 223, the process saves the location, any fence established, any track established, etc. to a local database along with the observed or analysis-driven TPMS recommendations. A very skilled driver may elect to set their own preferred TPMS settings for a given instance such as this, and that can also serve as a baseline recommendation in the database. The process also sends the data to the cloud 225, either automatically or at the driver's option. The data sent to the cloud can include not only the course information, but also performance information for the vehicle 101 so that other models can also be improved through analysis of such data.

Figure 3:
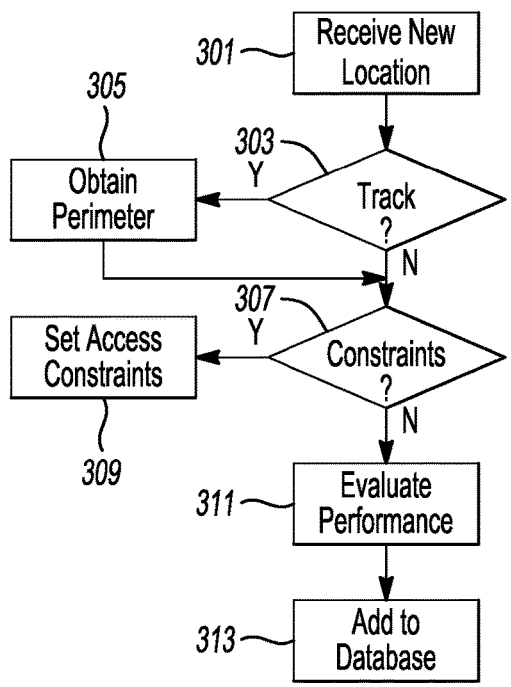
FIG. 3 shows an illustrative example of TPMS-change environment logging.

FIG. 3 shows an illustrative example of TPMS-change environment logging. This process allows for the inclusion of new data to a database usable to model preferred TPMS settings for a given location or given conditions.

In this example, the process receives an indication that there is a new location being logged at 301. The driver may specify if this is a track at 303, or, for example, the location may simply be a person driving off-road on their personal property, with no particular course or path. If there is a track at 303, the process may obtain a perimeter for the track at 305, which can be observed by watching the user drive or may be designated by the user or associated with a new track loaded or created by the user. If there is not a bounded perimeter to be gathered, the process may set a limited geo-fence around an entry point, e.g., where the driver entered the off-street location, which can be useful as a future trigger if the vehicle passes through the bounded fence on the way to the off-street location.

The process also determines if there are any constraints associated with the location or track at 307. These can be uploaded as part of a data set at 225, and can include, for example, indications that the track is private, has access restrictions, has certain vehicle requirements, has certain pressure or tire requirements, etc. This allows drivers to share "private" track information for modeling purposes without worrying about the track data being shared with everyone who has database access, and so while the additional information is not necessary, it is useful in some instances, especially if personal-land driving is uploaded for a property not intended to be open to the public.

If there are any access-related constraints, those are set at 309. For example, private track data may simply not be shared without express uploader permissions or access to a password or account name. Public tracks may have access provisions related to permitting or vehicle requirements. While the system may still provide such track data to vehicles that do not meet the constraints, the constraints may also be noted so that the driver does not attempt a track that is unsuitable for the driver or vehicle being driven.

If the upload at 225 also includes performance data (e.g., how the vehicle 101 performed under the uploaded tire pressure settings), the process can analyze this data to model improved TPMS settings for the specific locality, similar localities and for similar vehicles at 311. This can include evaluation of conditions, feedback states, and general contemplation of vehicle performance with the current pressure settings. The process can add both the track and the performance settings to the database at 313.

An initial database record for a new track may be for a single vehicle on the track. This data can be used to either set a baseline or extrapolate baselines for other different vehicles. The specific vehicle data can also be saved with respect to the track to use for recommended improvements as more data is later accrued relating to the track, the vehicle, or similar vehicles or tracks at other locations. Thus, even a track that has only been run once may include a variety of recommendation data, based on using the running vehicle as a baseline and then finding comparable tracks and importing a variety of already-gathered data about how other vehicles are expected to perform, and thus the recommended tire pressures, for the given track.

Figure 4A:
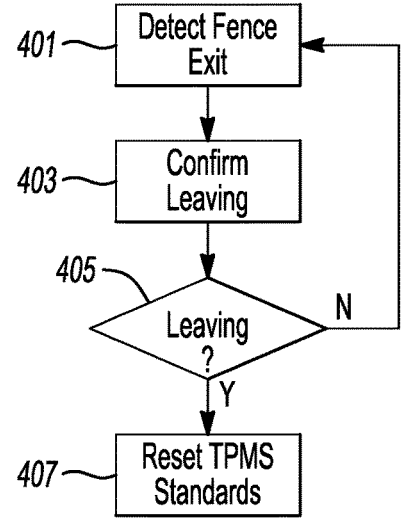

FIGS. 4A and 4B show illustrative examples of reversion processes. These are examples of processes that help the user avoid excessive travel on over or underinflated tires when leaving the off-street environment (or ending an on-street race). If a given implementation chooses to simply disable the TPMS while off-street, then this would be an opportunity to re-enable the TPMS with the baseline settings. In other instances, this is where the TPMS is reverted to the baseline, from any on-track settings.

In FIG. 4A, the process determines that the vehicle 101 has left the track based on GPS coordinates compared to a fence or bounded region at 401. Since the driver may have simply temporarily driven out of bounds, the process may confirm that the vehicle 101 is, in fact, leaving at 403. If the vehicle is not leaving at 405, the process maintains the TPMS settings until another exit event occurs. If the vehicle is leaving, the process will revert to the TPMS settings for standard driving (or for whatever new course the vehicle has entered) at 407.

This reversion can trigger an alert state and may result in the same feedback process as described with respect to FIG. 2A, for the purpose of getting the tires back to the recommended pressure. In instances where there is not on-site air available, the alert may inform the driver to drive no faster than certain speeds, in order to avoid vehicle damage while traveling to an air-refill site.

FIG. 4B is similar to 4A, except that the process is triggered by a determination that the vehicle 101 has resumed "standard" travel. This can include traveling on known roads, traveling over smooth (and likely paved) terrain, traveling at posted speed limits, etc. at 421. Following such a trigger, the process can take similar steps to those in 4A for reversion to TPMS settings. Here, the process also determines if there was a new track created by the recent travel (e.g., one not in the database) at 423, and this may be an opportunity to update the track data, since the vehicle 101 has presumably completed mapping and traveling on the new locality.

FIG. 5 shows an illustrative example of TPMS-based planning. This is an illustrative example of a process that can aid a driver in correctly pressurizing tires and/or minimize travel on tires that are not pressurized for the current travel.

Since a driver may be traveling to a location where inflation is recommended, and since the location may not have on-site inflation capability, the driver may benefit from a knowledge of where inflation can be obtained prior to reaching the course. Alternatively, if the driver deflated their tires, and on-site inflation is not possible, the driver may benefit from a knowledge of where inflation can be quickly obtained after leaving the track. The former can avoid the driver driving too long on overinflated tires, after inflation, and the latter can avoid the driver driving too long on underinflated tires, after track usage.

In this example, the process evaluates a planned route at 501 to determine if there are any TPMS variation locations along a route at 503. This can include destinations that are at known tracks, or planned travel across a locality sufficient in size to result in a TPMS change recommendation. For example, 45 miles of planned travel on a rough, unpaved road may result in a TPMS change recommendation, even if the driver is not technically using the vehicle 101 in an "enhanced performance" manner.

If there are reasons where TPMS changes may be instituted along the route, the process notifies the driver of the possible locations at 507, providing an opportunity for the driver to confirm whether or not the driver will be changing tire pressure as recommended at 509. Otherwise, the process will simply present the route 505, as it has no tire pressure changes.

If the driver indicates an intent to adjust tire pressure at an adjusted TPMS location identified by the process (or the driver could select a location where a change is intended, even if the process did not identify any such locations), the process determines if the driver will be inflating the tires at 511. Since the only two options are inflation and deflation, and the driver has indicated an intent to change from a current state, there is not a second check for deflation, but such a check, or both checks, are within the scope of contemplation.

If the driver is going to inflate the tires, then the driver may need a location prior to reaching the TPMS adjustment zone, where the driver can inflate tires. This information can be presented whether or not there is on-site (or whether the driver carries onboard) inflation, and/or can be presented upon system settings or request.

The process searches for one or more known locations for inflation, which can include the adjustment-zone itself, at 513. The search is initially done along the route prior to reaching the track, but can be expanded as needed if there are no locations found. If a location is not found within a reasonable distance from the track at 515 (reasonable being driver defined, OEM defined, or having another baseline), then the process can offer dispatch of refill services at 521.

Refill services can include a service vehicle or, for example, a drone whose function is to provide a mobile air-compressor. Depending on vehicle requirements and configurations, it may be possible to dispatch a large drone with compressor capability, that may be able to reach a vehicle virtually anywhere. The drone could even recharge and/or power the compressor from the on-site vehicle, in order to maintain sufficient power to get to a next-site. Alternative, more conventional offerings include a service vehicle traveling to the location of the vehicle somewhere before it reaches the track (or meeting the vehicle at the track).

In a similar manner, if the driver is going to deflate the tires at the location at 511 (no to inflate), then the search may be performed for post-track locations at 513. The search itself may occur prior to the vehicle ever reaching the track, because a driver may want to know that there are sufficient options for refill prior to deflating tires. Again, the search can be performed within a reasonable initial boundary or along a return route or route continuing after the track, and expanded as reasonable. Also, again, if there are no suitable options, the driver can be presented with an option to schedule a refill meeting with a service vehicle or drone at 521. The process will then add any selected, or noted, or agreed-upon locations to the route at 517, to remind the driver to travel to the location at the appropriate time. A reversion to TPMS could trigger a route-reminder, or passing an intended refill location could trigger a route-reminder, so that the driver was reasonably likely to obtain the reminder in a useful timeframe.

A computer analyzing a route in such a manner (be it a cloud or vehicle computer) may also push a reminder to a user phone to bring an air compressor if the track lacks inflation capability and/or there is insufficient capability within a predefined distance—e.g., a maximum distance at which travel on underinflated tires is recommended. For example, if a route or calendar included a track or an appointment for track-time, the process may also determine the accessibility of re-inflation options and take the actions above or similar actions in order to mitigate the impact of a lack of accessible re-inflation options.

FIG. 6 shows illustrative views of TPMS before and after adaptation to an environment. In this example, the first display 601 is a conventional TPMS recommended display that may be shown for a vehicle 603 traveling on streets in conventional manners. Each tire may have a recommended pressure 609 and a current pressure 607. If the driver of this vehicle were to deflate tires for off-road driving, without an adaptive TPMS system, the alerts 605 would persist and may become aggravating if the driver had the tires intentionally low.

In 611, the TPMS has undergone adaptation to the environment (through methods described herein or the like) and thus the alert 605 is no longer present. The values for recommended 617 and current 615 tire pressures now match as well, and the driver can visually confirm that the tire pressures are set for the intended type of travel. A status indicator 613 can be shown that notifies the driver of the TPMS adaptation, and this confirmation may also be useful if the driver drives off-site and the reversion to the TPMS fails to occur, so the driver checking the pressure will see that the setting values were adapted to the track. If the reversion occurs as intended, then the status message may change to an alert such as 605, since the "standard" values will again be applicable once the vehicle 101 has left the track.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A system comprising:
 a processor enabled to:
 determine that a vehicle is within a predefined proximity of a location for which an alternative tire pressure different from a current vehicle tire pressure has been defined, wherein the alternative tire pressure is received from a cloud-system responsive to a request from the vehicle, the request identifying the location of the vehicle and requesting tire pressure recommendations for a track proximate to the location of the vehicle;
 responsive to determining that the vehicle is within the predefined proximity, change a tire pressure monitoring system setting to utilize the alternative tire pressure as an alert threshold;

determine that a vehicle has traveled more than a predefined distance from the location; and responsive to the vehicle having traveled more than a predefined distance, revert the tire pressure monitoring system to use base settings for alert thresholds.

2. The system of claim 1, wherein the determination that the vehicle is within a predefined proximity of the location is based on a wireless signal received by a vehicle transceiver, in communication with the processor, from a transmitter deployed at the location.

3. The system of claim 2, wherein the wireless signal includes at least one recommended tire pressure setting.

4. The system of claim 1, wherein the determination that the vehicle is within a predefined proximity of the location is based on a GPS location of the vehicle compared to a data set of known locations having defined alternative tire pressure recommendations associated therewith.

5. The system of claim 1, wherein the processor is configured to delay alerts based on the alternative tire pressure until at least one of the vehicle is determined to be within a boundary defining a track or tire pressure settings have been changed to within a predefined threshold of the alternative tire pressures.

6. The system of claim 1, wherein the processor is configured to alert the user responsive to determining that the vehicle has traveled more than the predefined distance and responsive to the alternative tire pressure being lower than the base settings, including recommending a maximum speed based on the alternative tire pressure.

7. The system of claim 6, wherein the processor is configured to determine whether at least one pre-identified inflation location exists within a predefined proximity to a current location of the vehicle, responsive to alerting the user, and to provide navigation guidance to the inflation location responsive to alerting the user.

8. A method comprising:
determining that a vehicle is within a predefined proximity of a location for which an alternative tire pressure different from a current vehicle tire pressure has been defined, wherein the alternative tire pressure is received from a cloud-system responsive to a request from the vehicle, the request identifying the location of the vehicle and requesting tire pressure recommendations for a track proximate to the location of the vehicle;

responsive to determining that the vehicle is within the predefined proximity, changing a tire pressure monitoring system setting to utilize the alternative tire pressure as an alert threshold;

determining that a vehicle has traveled more than a predefined distance from the location; and responsive to the vehicle having traveled more than a predefined distance, reverting the tire pressure monitoring system to use base settings for alert thresholds.

9. The method of claim 8, wherein the determination that the vehicle is within a predefined proximity of the location is based on a wireless signal received by a vehicle transceiver from a transmitter deployed at the location.

10. The method of claim 9, wherein the wireless signal includes at least one recommended tire pressure setting.

11. The method of claim 8, wherein the determination that the vehicle is within a predefined proximity of the location is based on a GPS location of the vehicle compared to a data set of known locations having defined alternative tire pressure recommendations associated therewith.

12. The method of claim 8, further comprising delaying alerts based on the alternative tire pressure until at least one of the vehicle is determined to be within a boundary defining a track or tire pressure settings have been changed to within a predefined threshold of the alternative tire pressures.

13. The method of claim 8, further comprising alerting the user responsive to determining that the vehicle has traveled more than the predefined distance and responsive to the alternative tire pressure being lower than the base settings, including recommending a maximum speed based on the alternative tire pressure.

14. The method of claim 13, further comprising determining whether at least one pre-identified inflation location exists within a predefined proximity to a current location of the vehicle, responsive to alerting the user, and to provide navigation guidance to the inflation location responsive to alerting the user.

15. A non-transitory computer readable storage medium, storing instructions that, when executed, cause a processor to perform a method comprising:
determining that a vehicle is within a predefined proximity of a location for which an alternative tire pressure different from a current vehicle tire pressure has been defined, wherein the alternative tire pressure is received from a cloud-system responsive to a request from the vehicle, the request identifying the location of the vehicle and requesting tire pressure recommendations for a track proximate to the location of the vehicle;

responsive to determining that the vehicle is within the predefined proximity, changing a tire pressure monitoring system setting to utilize the alternative tire pressure as an alert threshold;

determining that a vehicle has traveled more than a predefined distance from the location; and responsive to the vehicle having traveled more than a predefined distance, reverting the tire pressure monitoring system to use base settings for alert thresholds.

16. The storage medium of claim 15, wherein the determination that the vehicle is within a predefined proximity of the location is based on a wireless signal received by a vehicle transceiver from a transmitter deployed at the location and wherein the wireless signal includes at least one recommended tire pressure setting.

17. The storage medium of claim 15, wherein the determination that the vehicle is within a predefined proximity of the location is based on a GPS location of the vehicle compared to a data set of known locations having defined alternative tire pressure recommendations associated therewith.

18. The storage medium of claim 15, the method further comprising delaying alerts based on the alternative tire pressure until at least one of the vehicle is determined to be within a boundary defining a track or tire pressure settings have been changed to within a predefined threshold of the alternative tire pressures.

* * * * *